Nov. 6, 1956  G. H. BUGENHAGEN  2,769,345
VARIABLE SPEED MECHANISM
Filed April 10, 1953  2 Sheets-Sheet 1

INVENTOR.
GEORGE H. BUGENHAGEN
BY Carroll R. Isons
Atty.

Nov. 6, 1956 G. H. BUGENHAGEN 2,769,345
VARIABLE SPEED MECHANISM

Filed April 10, 1953 2 Sheets-Sheet 2

INVENTOR.
GEORGE H. BUGENHAGEN
BY Carroll R. Jones
Atty.

United States Patent Office 2,769,345
Patented Nov. 6, 1956

2,769,345

VARIABLE SPEED MECHANISM

George H. Bugenhagen, Minot, N. Dak.

Application April 10, 1953, Serial No. 347,985

4 Claims. (Cl. 74—230.17)

The invention relates to a variable speed drive mechanism and more especially to one adapted to be used with the conventional rubber V-belts.

The principal object of the invention is to provide a variable speed drive wherein the belt tension is under control regardless of the position of the belts and the pulleys.

Another object of the invention is to provide a pair of opposed adjustable pulleys with the adjustable faces actuated by a single connecting arm.

Another object of the invention is to provide adjustable sheaves having the inner faces comprised of annular grooves and fins adapted to mate with each other.

Other further objects will be apparent during the course of the following description, which, taken in connection with the annexed drawings sets forth in detail certain means of carrying out the invention, such disclosed means illustrating, however, but several of the various ways in which the principle of the invention may be used.

Figure 1:
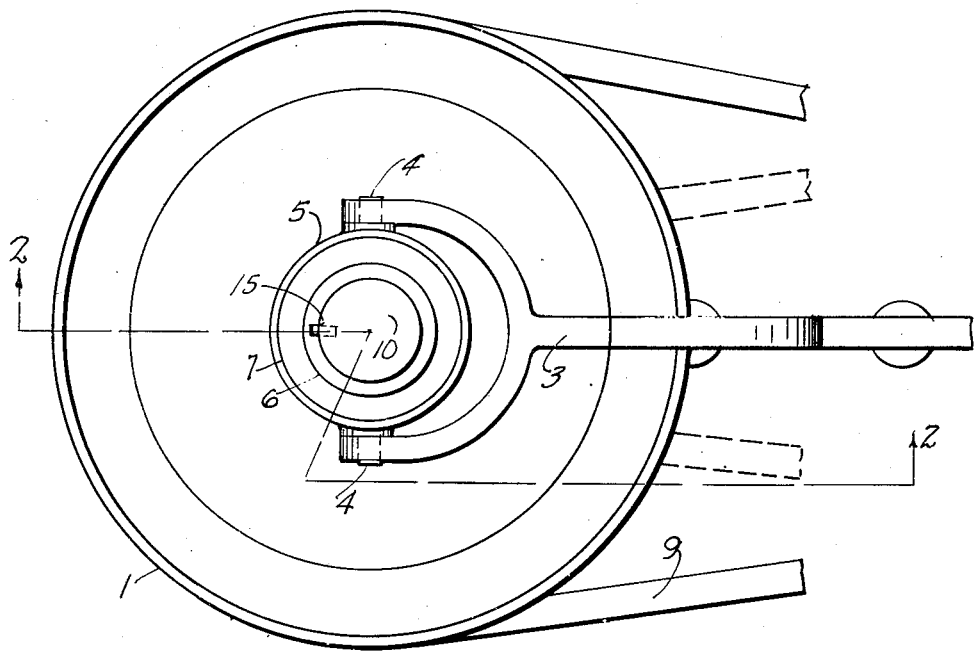
Fig. 1 is a fragmentary side elevation showing one of the adjustable pulleys and the control yoke.
Figure 2:
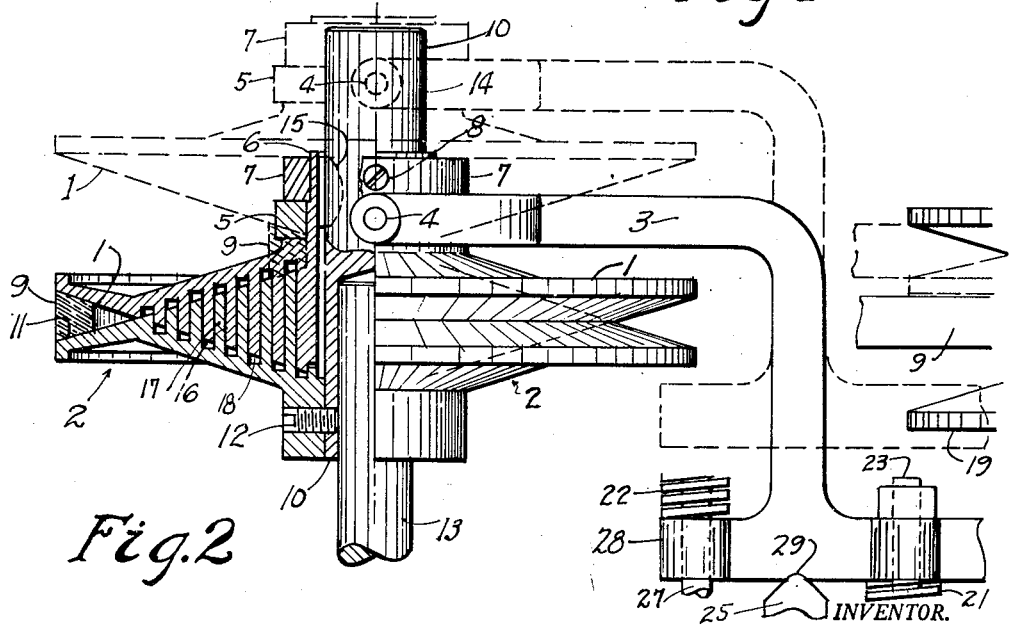
Fig. 2 is a view taken along lines 2—2 of Fig. 1 looking in the direction of the arrows.

Referring to Figs. 1 and 2 the movable face 1 of the pulley or sheave designated generally by numeral 2 is controlled or actuated by yoke member 3. The yoke member 3 is pivotally mounted on pins 4 carried by ring member 5 which slides over the nave or hub 6 of the movable face 1 of pulley 2. The yoke member 3 is loosely mounted on pins 4 to provide sufficient flexibility to allow the yoke member 3 to rock slightly and thus accommodate the slightly varying belt distance travel encountered when the belt is in different positions on the sheave faces. A collar 7 secured to hub 6 as by set screw 8 holds ring member 5 on hub 6. V-belt 9 is shown running in pulley 2. Referring more specifically to Fig. 2 it will be seen that the pulley 2 is mounted on sleeve 10 and the fixed face 11 of pulley 2 is secured in fixed relation to sleeve 10 by set screw 12. A driven shaft 13 is mounted on one end of sleeve 10 and is also secured to sleeve 10 and fixed face 11 of pulley 2 by set screw 12. The other end of sleeve 10 has integral therewith an extended stub shaft 14 which is provided to allow the necessary movement of the movable face 1 of pulley 2. It will be apparent that in those instances when the driven shaft 13 is of sufficient length the sleeve 10 may be modified to allow the driven shaft to extend clear through so as to replace the stub shaft 14. A Woodruff key 15 engages stub shaft 14 and slidably engages a keyway in the hub 6 of movable pulley 1. The inner faces of pulley 2 are provided with alternate annular, or if desired, spiral grooves 16 and projecting fins or fingers 17 which are arranged so that the fins 17 on the inner face of one half of the pulley mesh with complementary grooves 16 on the face of the opposed half of the pulley. The ends of fins 17 are tapered as indicated at 18 to fit the sides of the V-belt 9 as the latter moves down in the sheave 2 when the movable face 1 is moved away from fixed face 11. The spacing of the grooves 16 and fins 17 is such that when the belt moves down in this area it will engage at least two fins at one time. The yoke member 3 is adapted to control or actuate a second adjustable pulley all as seen more clearly in Fig. 3.

Figure 3:
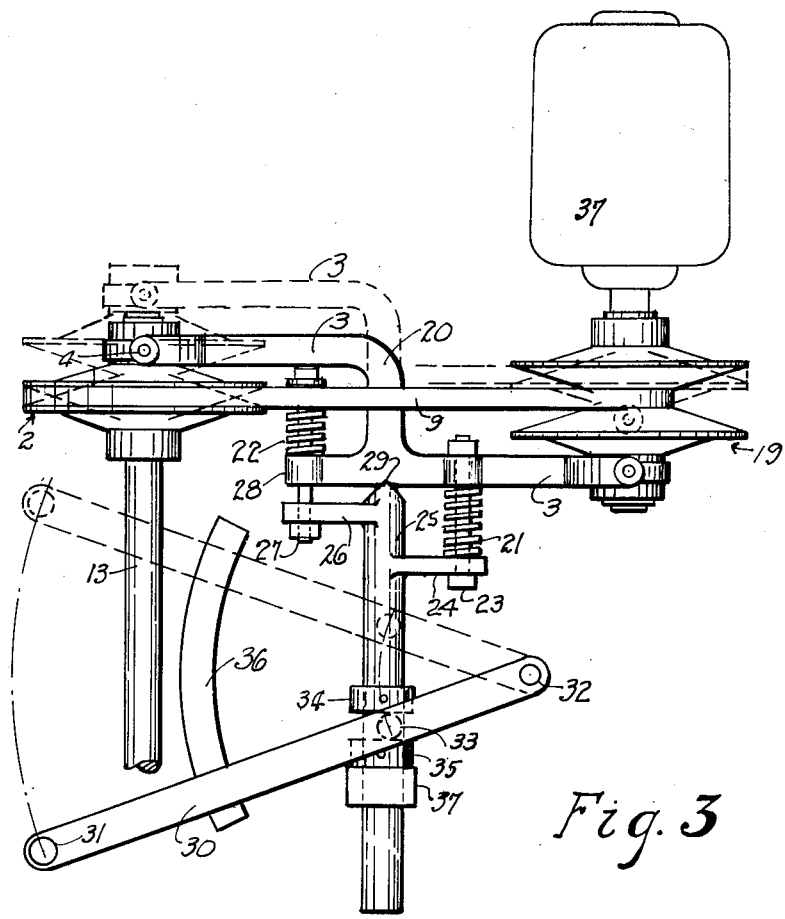
Fig. 3 is a top or plan view of the device of the invention.

Referring to the assembly drawing of Fig. 3 it will be seen that the second adjustable pulley or sheave 19 is of exactly similar construction to sheave 2 and that it is actuated or controlled in an exactly similar manner by an extension of yoke member 3. Like parts on each pulley have therefore been designated by like numerals. In the case of sheave 19 the opposite face is movable and therefore the arm of yoke member 3 is bent at right angles at 20 so that each end of the yoke is adapted to engage opposite faces of the opposed sheaves 2 and 19. An important feature of the invention is provided in compensating coil springs 21 and 22 mounted on either side of the center of yoke member 3. A bolt 23 extends through yoke member 3 and holds spring 21 against the bottom of yoke member 3 and extension plate 24 carried by control arm 25. Control arm 25 also carries a second extension plate 26 in which bolt 27 is mounted. Bolt 27 further extends through an extension 28 on the arm of yoke member 3 and holds compression spring 22 against the top of yoke extension 28. A pivot seat 29 is provided in the yoke member 3 for control arm 25, the latter being movably mounted in guide block 37. Control arm 25 is actuated by lever arm 30 having a handle 31 and a fixed pivot point 32. The lever arm 30 mounts on pin 33 which operates between collars 34 and 35 fixed to control arm 25. If desired an index quadrant 36 may be provided and graduated to indicate actual or relative speeds of the shaft. A motor 37 drives one of the paired movable pulleys.

Figure 4:
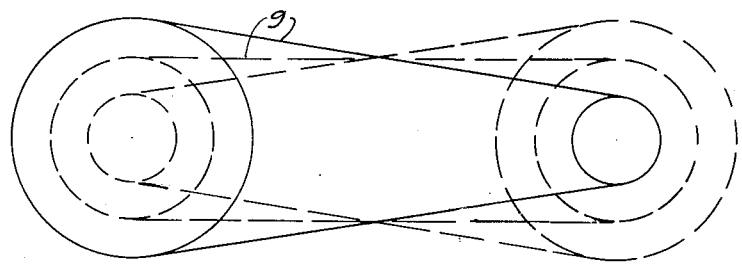
Fig. 4 is a diagrammatic sketch of the various positions the belts may take during the operation of the variable speed drive.

In Fig. 4 it is diagrammatically shown that the V-belt 9 travel distance is slightly shorter when the sheaves 2 and 19 are in such a position that the belt engages the same diameter of each pulley, and that the V-belt 9 travel distance is slightly longer when it engages a major diameter of one pulley and a minor diameter of the other pulley. This change in distance is accommodated by the use of the coil springs 21 and 22 which permit the yoke member 3 to rock slightly and still maintain uniform tension on the belt. The construction and location of the springs is such that as the V-belt moves out to the major diameter the belt pressure increases and tends to separate the pulley faces thus causing the spring to resist this force on the respective side. At the same time the pulley faces on the other pulley will be relaxed and will not be required to supply as much pressure to the belt since the lever arm has in effect been shortened. Thus more uniform tension on the V-belt is provided at all times regardless of the position of the belt in either sheave or pulley and the speed of the driven shaft is susceptible of instantly controllable variable speeds.

It will be readily appreciated that various combinations of the pulleys may be employed without departing from the spirit of the invention. For example a sheave with two spaced apart fixed faces and a movable two faced center face or element between would provide a double adjustable pulley wherein one driving belt engages the one V of the double sheave while another belt engages the other V of the double sheave. This arrangement mounted on a movable support to move the pulleys in and out of belt loops would provide a step-up or a reducing station. Additionally the construction lends itself to large diameters and thus heavy duty operation.

It will be apparent that the grooved and finned pulley faces can be constructed in such a manner that the fins and grooves are integral with the side of the sheave or if desired these elements can be made up as an insert kit for attachment to the faces of the sheaves admitting of replaceable units.

I claim:

1. In a variable speed drive the combination which comprises spaced apart opposed pulleys, each of said pulleys having a fixed half and a movable half with a movable half of one pulley opposite the fixed half of the other pulley, annular grooves and fins carried by the inner faces of each pulley with the fins adapted to mate with the grooves carried by the opposed pulley faces, a yoke member connecting the movable halves of the two pulleys adapted to urge the movable faces toward and away from the fixed pulley faces, a control arm pivotally mounted on the yoke member adapted to control the position of the yoke, and belt tension control springs mounted on the control arm on each side of the pivot point and connected to the yoke member so as to apply pressure to the movable pulley faces through the yoke.

2. In a variable speed drive the combination which comprises spaced apart sheaves, each of said sheaves having a fixed face and a movable face with the movable face of one sheave opposite the fixed face of the other sheave, with the inner faces of opposed sheaves carrying annular grooves adapted to mate with fins carried by the inner faces of each sheave, an actuating yoke member connecting the movable faces adapted to move the movable face of one sheave away from the fixed face while moving the movable face of the other sheave toward the fixed face of this sheave, a control arm adapted to contact the yoke member and control the position of the latter, and belt tension control springs mounted on the control arm at each side of the point where the control arm contacts the actuating yoke member and connected to the actuating yoke member so as to apply pressure to the movable sheave faces and hence the driving belt.

3. In a variable speed drive the combination which includes spaced apart sheaves; each of said sheaves having a fixed face and a movable face, with the movable face of one sheave opposite the fixed face of the other sheave and with each of the inner faces carrying annular grooves adapted to mate with fins carried by the inner faces of each sheave; a yoke member connecting the movable faces of the sheaves; a control arm mounted in contact with the yoke member adapted to move the movable faces toward and away from the fixed faces; and coil springs mounted on the control arm and connected to the yoke member adapted to apply pressure to the movable pulley faces and hence the driving belt.

4. In a sheave construction the combination of a fixed half and a movable half; each half carrying annular grooves and fins on their inner faces with the fins of one half adapted to slide into the grooves carried by the other half of a sheave; a yoke member connected to the movable portion of each of the sheaves adapted to be actuated to control the degree of separation of the two faces of the sheaves.

References Cited in the file of this patent

UNITED STATES PATENTS

| | | |
|---|---|---|
| 1,396,168 | Danger | Nov. 8, 1921 |
| 1,926,269 | Easter | Sept. 12, 1933 |
| 2,480,492 | Marsow | Aug. 30, 1949 |
| 2,577,913 | Peterson | Dec. 11, 1951 |